Jan. 30, 1940.  H. ANTRANIKIAN  2,188,588
RESISTANCE AND IMPEDANCE MEASURING DEVICE
Filed Dec. 11, 1937
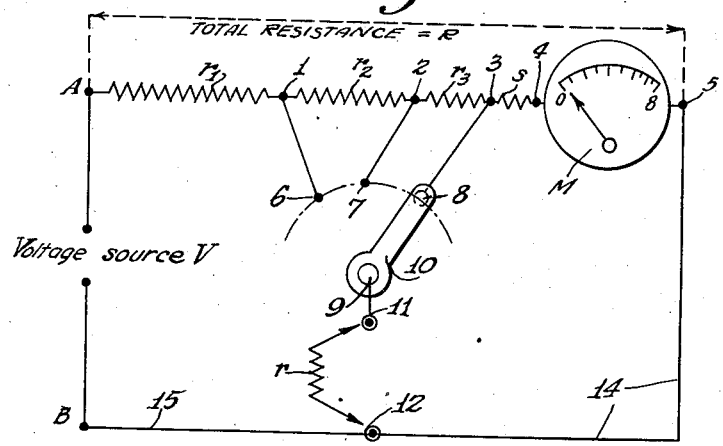
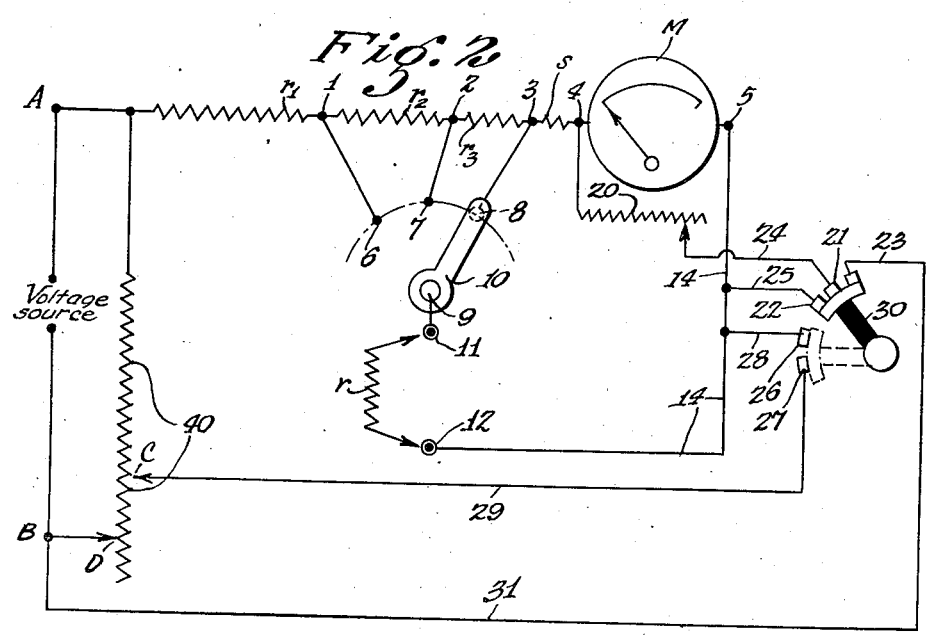
Inventor,
Haig Antranikian Patented Jan. 30, 1940

2,188,588

UNITED STATES PATENT OFFICE 2,188,588

RESISTANCE AND IMPEDANCE MEASURING DEVICE

Haig Antranikian, New York, N. Y.

Application December 11, 1937, Serial No. 179,300

4 Claims. (Cl. 175—183)

The invention relates to a resistance or impedance measuring device of the multirange direct reading type. In the hitherto known instruments of this type the high resistances are read on a backward numbered scale—i. e. numbered increasingly in the direction of decreasing currents in the indicating meter. It is true that many of them have also a scale division numbered forward—i. e. numbered increasingly in the direction of increasing currents—but on each of this latter type of scale a single range of resistances is read.

The instrument according to the present invention differs from the known types by the fact that it includes both of the following features: (1) it contains a scale division forward numbered (simply or severally); (2) more than one range of resistances or impedances—at least two—can be read on the same scale division, either for high or for low resistances or impedances. This improvement has the advantage of suppressing the somewhat awkward backward numbered scale division and makes thus the reading of the resistances or impedances easier.

Accordingly, one object of the invention is an instrument in which resistances or impedances of more than one range are read on the same forward numbered scale division, and this is accomplished by bridging the resistances or impedances to be measured on different points of a circuit having a meter and resistors of given relative values.

Another object of the invention is to have an ohmmeter according to the previous object and in which the bridging points are so chosen as to minimize the total resistance needed in the circuit.

Yet another object of the invention is to choose the relative values of resistors so that the ranges increase or decrease by decades.

Other objects of the invention will appear in the following specification and drawing in which Figure 1 shows the general arrangement of the circuits and Figure 2 shows the means preferably used for the so-called "voltage adjustment" in connection with the invention.

In Fig. 1 $r_1$, $r_2$, $r_3$, and $s$ are resistors connected in series, and M is a current measuring instrument, say a D. C. milliammeter, except for the fact that the scale division is made to read directly resistances or impedances as will be explained later. This meter, together with resistor $s$ (which may be on either side of meter M) has a resistance $m$, and the resistance of the whole, that is $r_1+r_2+r_3+m$, is equal to R. The end 5 of the circuit is connected to a terminal B through wires 14 and 15; the circuit thus formed between the terminals A and B will be called the main circuit. To the terminals A and B is connected a voltage source V, say a D. C. voltage source. To intermediate points 1, 2, 3, of resistors $r_1$, $r_2$, $r_3$, and $s$ are connected the connecting points 6, 7, 8, of a switch 10 which severally connects the said points 1, 2, 3, to a common point 9. This latter point is connected in turn to an external terminal 11 (or to a corresponding external lead, as the case may be); another external terminal 12 (or a lead, as the case may be) is connected to terminal B through the wire 15. The external resistance $r$ (or impedance) to be measured is inserted between these external terminals 11 and 12 (or corresponding leads, as the case may be) as shown diagrammatically. It must be understood that the number of intermediate points 1, 2, 3, has been chosen as being three by way of example; this number depends on the number of ranges desired and may be from two to any desired number, the switch 10 having then a corresponding number of switching points. In what follows the measurement of resistances will be first considered.

In the meter there is a common scale division numbered forward, from left to right (the zero current position of the pointer being supposed on the left), for the reading of the values of the exterior resistances in either of the positions of switch 10—each position corresponding to one range. The values in the different ranges are indicated, as usual in meters of this type, either by severally numbering the scale divisions or by indicating a multiplying factor on each position of the switch.

The total resistance R of the main circuit is chosen so that, for a given voltage of source V and in the absence of external resistance, the pointer of the meter M will have its maximum deflection (deflection which thus corresponds to $r=\infty$).

The subdivisions of the resistance R, that is $r_1$, $r_2$, $r_3$, etc. must have certain definite relations; I have found—and tested experimentally—that the same scale division (forward numbered, simply or severally) can be used for a multiplicity of ranges of the external resistances (corresponding to a multiplicity of switching points) when the following relations exist between divisional resistances:

$$r_1 = R/2(1+\sqrt{1-a})$$

$$r_1+r_2 = R/2(1+\sqrt{1-a/n})$$

$$\text{or } r_2 = R/2(\sqrt{1-a/n}-\sqrt{1-a})$$

$$r_1+r_2+r_3 = R/2(1+\sqrt{1-a/n^2})$$

$$\text{or } r_3 = R/2(\sqrt{1-a/n^2}-\sqrt{1-a/n})$$

in which $a$ is an arbitrary constant and $n$ the multiplying factor from one range to the following one. In general, the resistance corresponding to the $k$th range would be, as easily seen from the above, $$r_k = R/2(\sqrt{1-a/n^{k-1}} - \sqrt{1-a/n^{k-2}})$$

As for the resistance $m$ (including the resistance of the meter M and the resistor $s$), it is chosen, of course, so as to have a value R for the total resistance of the main circuit.

It is to be remarked that the last of the resistances in the order given corresponds to the lowest range and, therefore, in the example of Fig. 1, the connection of switch 10 to point 3 gives the lowest range, the connection to point 2 gives a range which is $n$ times the range corresponding to point 3, and the conection to point 1 gives a range which is $n$ times the range corresponding to point 3; in general, if there are $k$ connections, the connection of switch 10 to point nearest the terminal A will give the resistances in a range $n^{k-1}$ times the range corresponding to the connection nearest to the meter M. It is understood, of course, that other ranges with multiplying factor different from $n$ can be added, the corresponding resistances between switching points being calculated in the same way as for the factor $n$ except for the fact that the new factor replaces the number $n$.

I have also found that the total resistance R will be a minimum, for a given voltage source V and a given meter M, if the resistance $r_1$ is equal to half the resistance R, that is to say, if the constant $a$ is chosen equal to one. In this case the above given formulas become $$r_1 = R/2$$

$$r_1 + r_2 = R/2(1 + \sqrt{1-1/n})$$

$$\text{or } r_2 = R/2\sqrt{1-1/n}$$

$$r_1 + r_2 + r_3 = R/2(1 + \sqrt{1-1/n^2})$$

$$\text{or } r_3 = R/2(\sqrt{1-1/n^2} - \sqrt{1-1/n})$$

etc.,

To take an actual example, let $a$ be equal to one and $n$ be equal to 10, i. e. the ranges decrease by decades for connections from point 1 to point 3; then we will have $$r_1 = 0.5R$$
$$r_2 = 0.47435R$$
$$r_3 = 0.02315R$$

and for a fourth range we would have $$r_4 = 0.00225R$$

and so on. Of course the total resistance R must be large enough to leave room for the resistance of the meter M after the resistances corresponding to the switching points have been put in series. As is known, however, the resistance between the terminals of the meter can be lowered as much as desired by shunting the coil of the meter with a fixed resistance (not shown). It is understood also that if the resistance of the meter (with or without shunt) is equal to the difference between R and the resistances corresponding to the switching points, then the resistor $s$ must be omitted.

The scale division can be obtained by calculating the current flowing in the meter for different values of the external resistance $r$ and for a given voltage of source V in any one of the positions of switch 10; then the same scale division will be good for other positions of the switch—at least for those positions of the switch for which the multiplying factor $n$ can be indicated or the numbering can be made on the scale. The calculation requires only elementary knowledge of electrical laws and will not be indicated here as they are well known by persons skilled in the art.

Figure 2 shows two devices for the so called "voltage adjustment" (i. e. a means for giving correct readings even when the voltage of source V is higher than that for which the instrument is built) together with switching means for shifting from one device to the other. The reason for this switching is that it was found that the error introduced by the adjusting device, in an instrument in accordance with the invention, is small when the means known as the "shunted meter adjustment" is used for higher ranges of resistance readings and when a potentiometric adjustment of the voltage is used for the lower ranges of resistance readings.

Referring to Fig. 2, 20 is a variable resistance one end of which is connected to terminal 4 of the meter M and the other end of which is connected, through a wire 24, to a switching point 21 of a switch 30. This latter switch, in the position shown by the continuous line, connects the point 21, on the one hand to wire 14 (i. e. to both terminal 5 of meter M and point 12), and, on the other hand, to terminal B through wire 31 (i. e. to one of the poles of voltage source V). The circuit thus formed is the same as the main circuit of Fig. 1 except for the fact that a variable resistance 20 is shunted with the meter. The operation of this type of voltage adjustment is well known and does not require further explanation; it is enough to remark that since, as already said, this type of adjustment is adequate for the higher resistance ranges, the switch 30 should be in the position just described at the same time as switch 10 is thrown, say, on points 6 and 7.

When lower resistances are to be measured, that is when switch 10 is thrown, say, on point 8, the switch 30 is thrown at the same time in the position indicated by dotted lines; in this position of switch 30 the circuit of variable resistance 20 remains open, as easily seen, and both terminals 5 and 12 are connected to point C of a potentiometer 40 (this connection is made through wire 14, wire 28, switch point 26 connected to switch point 27 through switch 30, and wire 29). The circuit thus formed is the same as the main circuit of Fig. 1 except for the fact that the terminals of the circuit are now A and C instead of A and B and also for the fact that voltage source V is now connected between terminal A and a point D of potentiometer 40. As is known, the voltage between terminals A and C of the main circuit can be adjusted to any required value (under the voltage of the source) by varying either of the contact points D or C of potentiometer 40.

It is easily understood that the two switches 10 and 30 may be mechanically interconnected so that the proper connections of both switches, as explained above, can be made simultaneously It has been supposed above, as an example, that the meter M was a D. C. meter and that, accordingly, V was a D. C. voltage source. Nothing is changed in the invention, however, if an A. C. meter is used together with an A. C. voltage source, provided that the resistances used in the main circuit are non-inductive for the frequency of the current used. It is also evident that a D. C. meter M can be used with an A. C. voltage source, provided that the current in the circuit is rectified anywhere between the voltage source and the meter.

The apparatus described above can be used for measuring impedances other than resistances (i. e. inductances); for, if an A. C. voltage source of a given frequency $f$ is used, when the external resistance $r$ is replaced by an inductance Z the currents in the meter M will be the same as the resistance equivalent to the impedance Z at the given frequency $f$. For instance, if Z is a self-inductance the readings on the resistance scale will be equal to $2\pi fZ$. Of course, the scale division may be made to correspond to $$Z=\frac{r}{2\pi f}$$

and numbered to read directly the values of Z. (With this point of view the meter may have two scale divisions and numberings, one for reading resistances and the other for reading impedances or self inductances). For this reason the word resistance has not been used as the thing measured in the following claims but the word impedance has been used instead, meaning either resistance or inductance or both.

It must be understood that the fact that a single scale division is used for many ranges of resistances or impedances does not exclude the cases where other scale divisions are used for other purposes in the same meter, as is the case, for instance, in the volt-ohm-milliamperemeter currently sold on the market.

What I claim is:

1. In combination, resistors and a meter in series between two terminals—the resistors having values decreasing toward the meter—, means for severally connecting points between said resistors and meter to a common point, means for connecting external impedances between said common point and the one of said two terminals which is on the meter side, means for connecting a voltage source between said two terminals, a forward numbered common scale division in the meter for indicating the values of the external impedances for the several connections of said severally connecting means, a first "voltage adjusting" means of the type of a variable resistance shunting the meter, a second "voltage adjusting" means by a potentiometer connected to the voltage source, and means for passing from one adjusting means to the other adjusting means.

2. In combination, a circuit of total resistance R having in series at least two resistances, the first of which has substantially the value $$R/2(1+\sqrt{1-a})$$

and the other (or others) substantially the successive values $$R/2(\sqrt{1-a/n}-\sqrt{1-a})$$
$$R/2(\sqrt{1-a/n^2}-\sqrt{1-a/n})$$
$$R/2(\sqrt{1-a/n^3}-\sqrt{1-a/n^2})$$

where $a$ is an arbitrary positive constant and $n$ a scale multiplying factor greater than one, a meter connected to the last of said at least two resistances (with an additional resistance if needed to have the total resistance R), the first of said at least two resistances being connected to a first terminal and the other end of the circuit (including the meter) being connected to a second terminal, means for severally connecting at least two of the ends, excepting said first terminal, of said at least two resistances to a common point, means for connecting external impedance between said common point and said second terminal, means for connecting a voltage source between said first and second terminals, and means in the meter for indicating the values of the external impedance on a forward numbered common scale division for the several connections of said severally connecting means.

3. The combination of claim 2 in which the arbitrary constant $a$ is made substantially equal to one.

4. In combination, a circuit of total resistance R having in series at least two resistances, the first of which has substantially the value 0.5R and the other (or others) substantially the successive values 0.47435R, 0.02315R, and 0.00225R, a meter connected to the last of said resistances (with an additional resistance if needed to have the total resistance R), the first of said resistances being connected to a first terminal and the other end of the circuit (including the meter) being connected to a second terminal, means for severally connecting at least two of the ends, excepting said first terminal, of said at least two resistances to a common point, means for connecting external impedance between said common point and said second terminal, means for connecting a voltage source between said first terminal and said second terminal, and means in the meter for indicating the values of the external impedance on a forward numbered common scale division for the several connections of said severally connecting means.

HAIG ANTRANIKIAN.